United States Patent [19]

Hoffmann

[11] Patent Number: 4,711,331
[45] Date of Patent: Dec. 8, 1987

[54] FREEWHEEL OVERRUNNING CLUTCH, PARTICULARLY FOR A TWO-WHEEL VEHICLE

[75] Inventor: Joachim Hoffmann, Hagen, Fed. Rep. of Germany

[73] Assignee: Esjot-Werke Schiermeister & Junker GmbH & Co. KG, Ense-Niederense, Fed. Rep. of Germany

[21] Appl. No.: 880,890

[22] Filed: Jul. 1, 1986

[30] Foreign Application Priority Data

Jul. 2, 1985 [DE] Fed. Rep. of Germany ....... 3523545

[51] Int. Cl.$^4$ ............................................. F16D 41/28
[52] U.S. Cl. ....................................... 192/46; 192/64; 192/72; 384/523
[58] Field of Search ................. 192/46, 64, 72, 110 B, 192/41 A, 45.1; 384/523, 527

[56] References Cited

U.S. PATENT DOCUMENTS

| | | | |
|---|---|---|---|
| 2,226,247 | 12/1940 | Lesage | 192/46 |
| 2,342,227 | 2/1944 | Swenson | 192/45.1 |
| 2,407,772 | 9/1946 | Dodge | 192/45.1 |
| 2,423,178 | 7/1947 | Dodge | 192/45.1 |
| 3,938,632 | 2/1976 | Giese et al. | 192/41 A |
| 4,089,231 | 5/1978 | Segawa | 192/64 X |

FOREIGN PATENT DOCUMENTS 1264886 3/1968 Fed. Rep. of Germany ... 192/41 A

Primary Examiner—Rodney H. Bonck
Assistant Examiner—Richard M. Lorence
Attorney, Agent, or Firm—Karl F. Ross; Herbert Dubno

[57] ABSTRACT

A freewheeling overrunning clutch for a bicycle, moped, and the like vehicle comprises a plurality of clutch pawls present between an outer wheel and an inner wheel which are supportable elastically on one side on the inner wheel circumference and on the other side on a plurality of inner teeth of the outer wheel. In order to provide a simple, almost noise free structure which is easy to mount, the clutch pawls pivotally supported in a flexible supporting ring positioned between the inner and outer wheels. Ends of the clutch pawls which face the inner wheel are brought into engagement with the plurality of teeth protruding outward from the inner wheel. The flexible supporting ring advantageously may simultaneously be a spacing ring for a plurality of balls of a ball bearing or bearings positioned adjacent the clutch pawls between the outer and inner wheels.

14 Claims, 7 Drawing Figures

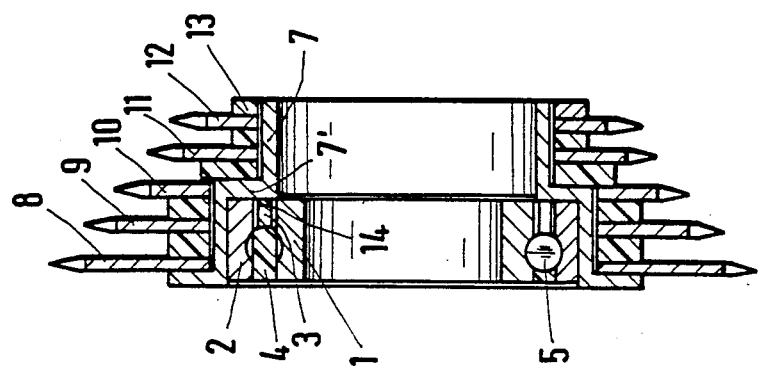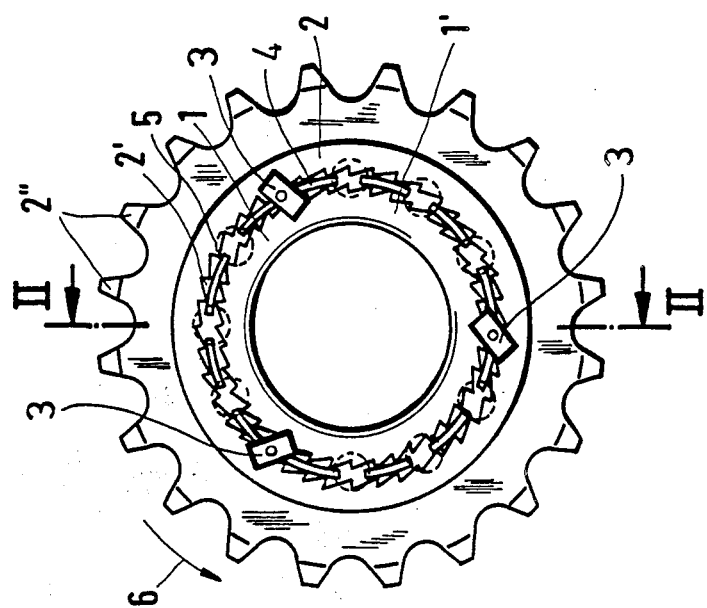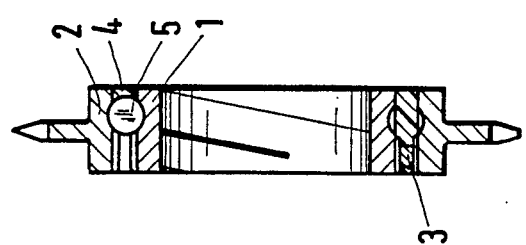

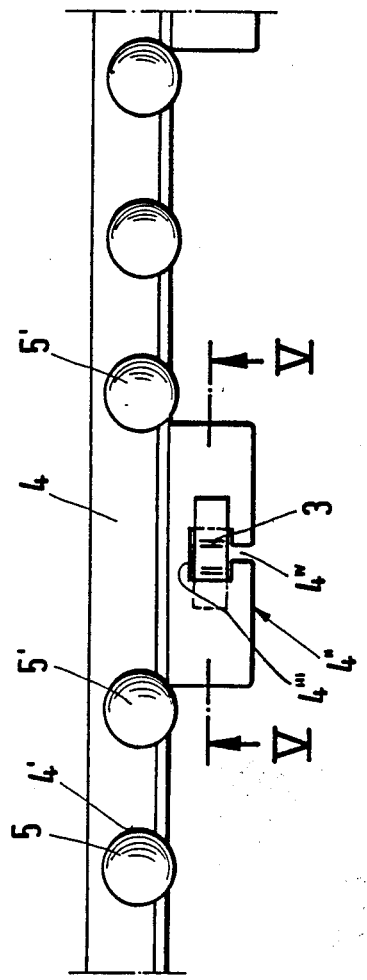
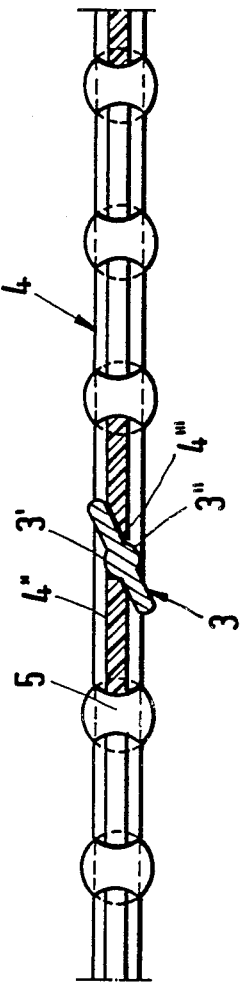

FREEWHEEL OVERRUNNING CLUTCH, PARTICULARLY FOR A TWO-WHEEL VEHICLE

FIELD OF THE INVENTION

My present invention relates to a freewheel overrunning clutch for a vehicle and, more particularly, to a freewheel overrunning clutch for a two-wheel vehicle such as a bicycle, moped or the like.

BACKGROUND OF THE INVENTION

A freewheel clutch can comprise a plurality of clutch pawls positioned between an outer wheel and an inner wheel which are supportable elastically on one side of the inner wheel circumference and on the other side of the inner gear teeth of the outer wheel.

In the known freewheel overrunning clutch, the clutch pawls are supported pivotally in recesses in the inner wheel circumference and mounted on spring clips or levers associated with them so that they lie elastically with their free ends in the inner gear teeth of the outer wheel and thus are engaged therein during coupled operation. The one sided pivotal support of the clutch pawls and their support by the spring levers or clips involves considerable manufacturing and mounting expense. Moreover such a clutch is not sufficiently quiet in operation.

OBJECTS OF THE INVENTION

It is an object of my invention to provide an improved freewheel overrunning clutch, particularly for a two wheel vehicle such as a bicycle, moped or the like, which overcomes drawbacks of the unidirectional freewheeling clutches of the art.

It is a further object of my invention to provide an improved freewheel overruning clutch which has a simple structure and is easy to mount so that mounting and manufacturing expenses are reduced.

It is another object of my invention to provide an improved freewheel overrunning clutch which runs almost noiselessly.

SUMMARY OF THE INVENTION

These objects and others which will become more readily apparent hereinafter are attained in a freewheel overrunning clutch for a bicycle, moped, and the like vehicle having clutch pawls present between an outer wheel and an inner wheel which are supportable elastically on one side of the inner wheel circumference and on the other side on inner teeth of the outer wheel.

According to my invention the clutch pawls are supported in a flexible and resilient supporting ring positioned pivotally between the innerand outer wheels. Ends of the clutch pawls which face the inner wheel are brought into engagement with teeth protruding outward from the inner wheel. Additional springs are unnecessary.

In this way a very simple freewheel overrunning clutch is provided in which the engaging pawls or catches are centrally embedded and supported in the resilient supporting ring and engage with both their free ends in the corresponding teeth in the inner and outer wheel in coupled operation. The freewheel running clutch of the invention runs practically noiselessly, particularly when the supporting ring carrying the clutch pawls is composed of a flexible plastic material.

It is particularly advantageous when the flexible supporting ring serves simultaneously as a spacing ring or cage for the balls of a ball bearing positioned laterally adjacent the clutch pawls present between the outer and inner wheels. By the adjacent positioning of the ball bearing and the clutch pawls a radially compact structure is attained. Also the spacing ring may be easily mounted between the outer and inner wheels.

According to a further feature of my invention the clutch pawls advantageously are supported in laterally projecting members of the spacing ring between some adjacent ball bearings. Each plate like clutch pawl extending inclined to the projecting member is present in the projecting member in a suitable rectangular pocket. In order to increase the resiliently flexible mounting of the clutch pawls still more each of the projecting members are advantageously provided with a slotted jaw. The slotted jaw extends in height to the pocket for the clutch pawl. The clutch pawl may be provided with a central guiding swelling or bulge preventing its longitudinal sliding in the pocket of the projecting member of the supporting ring. Advantageously three clutch pawls are used in my clutch.

The outer wheel to be coupled by the clutch pawls with the inner wheel can in the simplest case be a sprocket wheel. It is also possible however to provide a supporting rim on the outer wheel which carries one or a plurality of sets of sprocket wheels stepped in diameter and which has a corresponding stepped cross section. The rim or felly carrying the set of gears can cover with a radially running shoulder the radial clearance between the inner and outer wheels so as to contain the clutch pawls. One such structure can be used for a multispeed derailleur or gear shift for a two wheel vehicle such as a bicycle. The clutch pawls can also be laterally centrally located between two ball bearings instead of one. Advantageously the supporting ring may be composed either of a flexible plastic material or spring steel.

BRIEF DESCRIPTION OF THE DRAWING

The above and other objects, features and advantages of my invention will become more readily apparent from the following description, reference being made to the accompanying highly diagrammatic drawing in which:

FIG. 1 is a side elevational view of a first embodiment of a freewheel overrunning clutch as mounted in a two-wheel vehicle with an outer wheel which is a sprocket wheel;

FIG. 2 is an axial cross sectional view of the apparatus of FIG. 1 taken along the section line II—II of FIG. 1;

FIG. 3 is an axial cross sectional view of a second embodiment of a freewheel overrunning clutch for a five speed gear shift or derailleur;

FIG. 4 is a top plan developed view of the flexible plastic ring shown enlarged;

FIG. 5 is a cross sectional view of the plastic ring of FIG. 4 taken along the section line V—V of FIG. 4;

SPECIFIC DESCRIPTION

Figure 6:
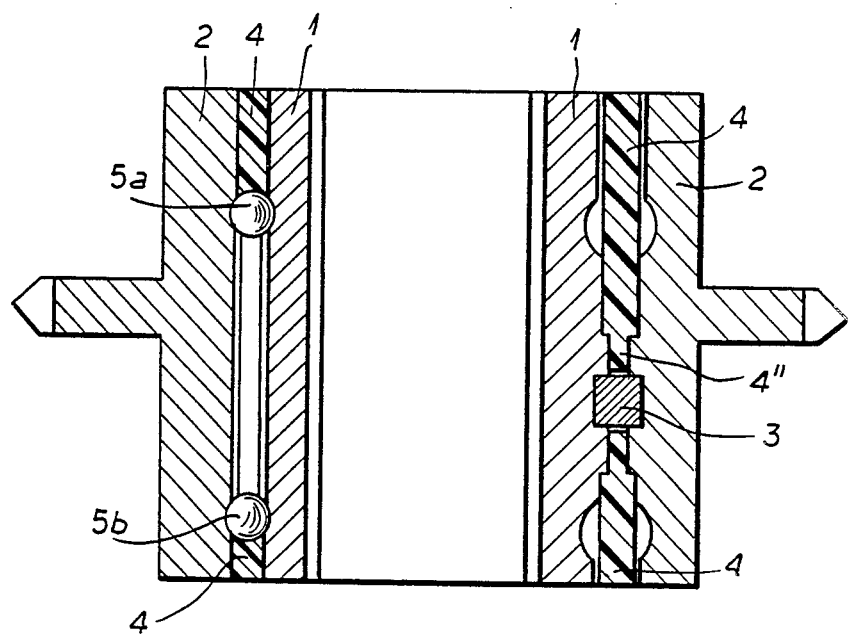
FIG. 6 is an axial cross sectional view of a third embodiment of a freewheel overrunning clutch similar to that of FIG. 1.

The freewheel overrunning clutch shown in FIGS. 1 and 2 comprises an inner wheel 1, an outer wheel 2 coupled with it and a plurality of clutch pawls 3 positioned between them, which are supported in a plastic ring 4 positioned between both inner and outer wheels 1 and 2. Pawls 3 use plastic ring 4 as a fulcrum to pivot similar to the fulcrumed arms of a balance or weighing beam.

These clutch pawls 3 can be brought into engagement with their outer ends on one side with the outer teeth 1' of the inner wheel 1 and on the other side with the inner teeth 2' of the outer wheel 2.

The outer wheel 2 in this embodiment is a sprocket wheel provided with outer teeth 2''. It is rotatably supported on the inner wheel 1 by the balls 5 of a ball bearing mounted also on the flexible plastic ring 4. In the illustrated embodiment three equal clutch pawls 3 are distributed around the plastic ring 4.

As shown in FIGS. 4 and 5 a plurality of recesses 4' are present for the balls 5 in the flexible plastic ring 4 which acts simultaneously as a spacing ring for the balls 5 of the ball bearing.

There is a larger spacing between some of the balls 5 than others. In these regions a projecting member 4'' is provided projecting laterally from the flexible plastic ring 4 as mounted in the vehicle, which receives and holds the plate like clutch pawls 3. For that purpose a rectangular pocket 4''' in the projecting member 4'' is provided through which the clutch pawl 3 extends inclined to the projecting member 4''.

Special guiding bulges or swellings 3' and/or 3'' are formed centrally on the coupling pawls 3 which prevent the clutch pawl 3 from being pushed longitudinally into the pocket 4''' but allow it to be held therein and/or pivotally supported.

In order to provide flexible support of the clutch pawl 3 in the projecting member 4'' the projecting member 4'' is divided by a jaw slot 4$^{IV}$ which is connected to the pocket 4'''. The projecting member 4'', divided to form a slotted jaw 4$^{IV}$, has a resulting greater flexibility so clutch pawls 3 can be slid along and/or past the opposing gear teeth 1' and 2' on the inner and outer wheel 1 and 2 in their released configuration still more easily over the one or the other or both of them.

The sprocket wheel or outer wheel 2 in the clutch shown in FIGS. 1 and 2 can be rotated in the direction shown by the arrow 6 so that the inner wheel 1 by engagement of the clutch pawls 3 in the outer wheel gear teeth 2' and the inner gear teeth 1' is moved with it. As soon as the rotation speed of the outer wheel 2 decreases in case of braking the outer wheel 2, the inner wheel 1 overtakes the outer wheel 2. Then the clutch pawls 3 ride out with their ends from one or both sets of gear teeth 1' and/or 2' and slide along them or it.

In the second embodiment shown in FIG. 3 a rim 7, rotationally fixed with respect to wheel 2, is mounted on the outer wheel 2 which carries two sets of gears with stepped sprocket wheels 8, 9 and 10 and/or 11 and 12 which are rigidly secured against rotation on the rim 7 having a suitably stepped cross section, for example by a threaded nut 13 which is screwed on the rim 7 which is provided with suitable threads. Between the sprocket wheels 8 to 12, stepped in diameter are the elastic spacer disks, which together with the sprocket wheels 8 to 10 and/or 11 and 12 are mounted rotationally fixed by keys, splined or milled like or knurled teeth on the rim 7. The ring or rim 7 has in its laterally central region a radially running shoulder 7' with which it covers the annular clearance 14 between the outer wheel 2 and the inner wheel 1 and of course under which the clutch pawls 3 are contained.

Figure 7:
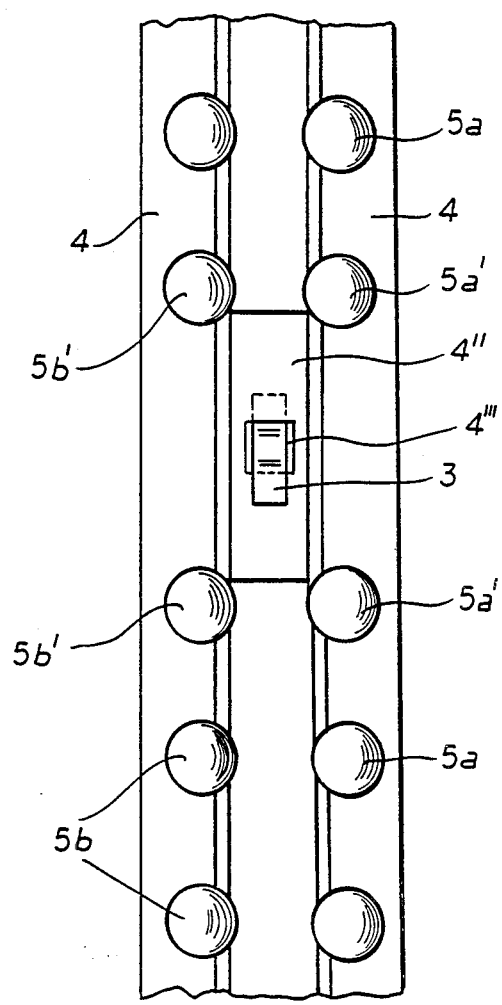
FIG. 7 is a top plan view of the rolled flat flexible plastic ring of the embodiment of FIG. 6 shown enlarged.

Of course many variations of the above two embodiments are possible within the scope of my invention. Thus in a third embodiment shown in FIGS. 6 and 7 the supporting ring 4 contains the balls 5a and 5b of two corresponding ball bearings positioned on both sides of its centrally mounted clutch pawls 3 allowing support of the outer and the inner wheels 1 and 2 by the two ball bearings. FIGS. 6 and 7 show that the clutch pawls 3 are laterally flanked by two ball bearings in a balanced structure. Furthermore in this embodiment the projecting members 4'' bridge the distance between opposing sides of the flexible supporting ring 4 which is shown in a developed form in FIG. 7. There are no slotted jaws in this embodiment.

Further the supporting ring 4 carrying the clutch pawls 3 may be composed of a spring steel instead of a flexible plastic material. Also another flexible material for example a nonferrous metal can also be used.

I claim:

1. In a freewheel overrunning clutch for a bicycle, moped, and the like vehicle having a plurality of clutch pawls present between an outer wheel and an inner wheel which are elastically supportable on one side on a circumference of said inner wheel and on the other side on a plurality of inner teeth of said outer wheel, the improvement wherein said clutch pawls are pivotally supported in a resilient flexible supporting ring positioned between said inner and outer wheels, said pawls each having an end facing said inner wheel which end is brought into engagement with a plurality of outer teeth on said inner wheel, said flexible supporting ring being simultaneously constituted as a spacing ring for a plurality of balls of a ball bearing, said ball bearing being positioned adjacent said clutch pawls and between said outer and inner wheels.

2. The improvement according to claim 1 wherein said clutch pawls are supported in laterally projecting members of said spacing ring between successive ones of said balls of said ball bearing, the projecting member being in a plane parallel to a plane of said bearing.

3. The improvement according to claim 1 wherein a further ball bearing with plurality of balls flanks said spacing ring, said spacing ring being sandwiched between the two of said ball bearings.

4. The improvement according to claim 2 wherein a rectangular pocket is formed in each of said projecting members of said flexible supporting ring for one of said clutch pawls, said pawls being inclined to said projecting member.

5. The improvement according to claim 4 wherein each of said projecting members on said supporting ring has a slotted jaw with an opening extending to said pocket for said clutch pawl.

6. The improvement according to claim 4 wherein each of said clutch pawls is provided with a central guiding bulge preventing sliding of said clutch pawl in said rectangular pocket of said projecting member.

7. The improvement according to claim 1 wherein said freewheel overrunning clutch has three clutch pawls distributed uniformly around said flexible supporting ring.

8. The improvement according to claim 1 wherein said outer wheel is a sprocket wheel provided with said inner teeth.

9. The improvement according to claim 1 wherein on said outer wheel at least one rim, rotationally fixed with repect to said outer wheel, is provided carrying two sets of gears each set having a plurality of sprocket wheels stepped in diameter, said fixed rim having a stepped cross section.

10. The improvement according to claim 9 wherein said fixed rim carrying said set of said gears covers with a radially running shoulder a radial clearance between said inner and outer wheels so as to contain said clutch pawls.

11. The improvement according to claim 1 wherein said supporting ring carrying said clutch pawls is composed of a flexible plastic material.

12. The improvement according to claim 1 wherein said supporting ring carrying said clutch pawls is composed of spring steel.

13. A freewheel overrunning clutch for a bicycle, moped, and the like vehicle comprising:
   an inner wheel;
   an annular outer wheel in which said inner wheel is mounted;
   a plurality of outer teeth on said outer wheel opposing said outer teeth of said inner wheel;
   a flexible supporting and spacing ring mounted between said inner and said outer wheels;
   a plurality of clutch pawls supported in said flexible supporting and spacing ring positioned between said inner and outer wheels, said pawls each having an end facing said inner wheel which end is brought into engagement with said plurality of said outer gear teeth on said inner wheel;
   a plurality of balls of a ball bearing positioned adjacent said clutch pawls between said outer and inner wheels;
   a projecting member of said supporting and spacing ring;
   a rectangular pocket in each of said projecting members of said flexible supporting ring for one of said clutch pawls, said pawls inclined to said projecting member;
   a slotted jaw in each of said projecting members with an opening extending to said rectangular pocket; and
   a central guiding bulge on each of said clutch pawls preventing sliding of said clutch pawl in said rectangular pocket of said projecting member.

14. The freewheel overrunning clutch according to claim 13 which has three clutch pawls distributed uniformly around said spacing and supporting ring.

* * * * *